US008358292B2

(12) United States Patent
Nagashima

(10) Patent No.: US 8,358,292 B2
(45) Date of Patent: Jan. 22, 2013

(54) DISPLAY DEVICE, ITS DRIVE CIRCUIT, AND DRIVE METHOD

(75) Inventor: Nobuyoshi Nagashima, Matsuzaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1113 days.

(21) Appl. No.: 11/922,756

(22) PCT Filed: Jul. 4, 2006

(86) PCT No.: PCT/JP2006/313313
§ 371 (c)(1),
(2), (4) Date: Dec. 21, 2007

(87) PCT Pub. No.: WO2007/015347
PCT Pub. Date: Feb. 8, 2007

(65) Prior Publication Data

US 2009/0079713 A1 Mar. 26, 2009

(30) Foreign Application Priority Data

Aug. 1, 2005 (JP) ................................ 2005-222589

(51) Int. Cl.
*G06F 3/038* (2006.01)

(52) U.S. Cl. .......... 345/204; 345/205; 345/96; 345/100; 345/208; 345/209; 345/210

(58) Field of Classification Search .................. 345/204, 345/87, 100, 213, 206, 98, 94, 208, 209, 345/210, 58, 95–96
See application file for complete search history.

(56) References Cited

U.S. PATENT DOCUMENTS 4,488,150 A * 12/1984 Kanatani ........................ 345/77
(Continued)

FOREIGN PATENT DOCUMENTS

| | | |
|---|---|---|
| EP | 1 235 199 | 8/2002 |
| EP | 1 286 202 | 2/2003 |

(Continued)

OTHER PUBLICATIONS

Extended European Search Report dated Nov. 5, 2010.

(Continued)

*Primary Examiner* — Lun-Yi Lao
*Assistant Examiner* — Olga Merkoulova
(74) *Attorney, Agent, or Firm* — Harness, Dickey & Pierce, P.L.C.

(57) ABSTRACT

It is possible to implement impulse display in a hold type display device while suppressing an increase in complexity of a drive circuit and an increase in operation frequency. In an active matrix type liquid crystal display device of a dot-inversion drive scheme which is configured such that adjacent source lines are short-circuited during a predetermined period Tsh every horizontal scanning period, a gate driver applies a pulse for turning on a TFT in a pixel forming section, as a scanning signal G(j) (j=1 to m) to be provided to each scanning signal line as follows. In each, frame period, a pixel data write pulse Pw is sequentially applied to gate lines GL1 to GLm and a black voltage application pulse Pb is applied during the above-described predetermined period Tsh which is after the lapse of a period (Thd) of the order of a ⅔ frame from the application of the pixel data write pulse Pw to each gate line GLj. The present invention is suitable for use in an active matrix type liquid crystal display device.

7 Claims, 7 Drawing Sheets

U.S. PATENT DOCUMENTS

| | | | | |
|---|---|---|---|---|
| 5,903,234 | A | 5/1999 | Kimura | |
| 6,046,790 | A | 4/2000 | Hara et al. | |
| 6,473,077 | B1 | 10/2002 | Takenaka et al. | |
| 6,642,916 | B1 | 11/2003 | Kodama et al. | |
| 6,876,349 | B2 | 4/2005 | Edwards et al. | |
| 6,937,224 | B1 | 8/2005 | Miyachi | |
| 7,369,124 | B2 | 5/2008 | Nakano et al. | |
| 7,843,410 | B2 | 11/2010 | Floyd | |
| 2002/0118154 | A1 | 8/2002 | Kim | |
| 2003/0011696 | A1 | 1/2003 | Yamazaki | |
| 2003/0058229 | A1 | 3/2003 | Kawabe et al. | |
| 2003/0090449 | A1 | 5/2003 | Arimoto et al. | |
| 2003/0151572 | A1 | 8/2003 | Kumada et al. | |
| 2004/0041763 | A1 | 3/2004 | Kodama et al. | |
| 2004/0104881 | A1* | 6/2004 | Furuya | 345/98 |
| 2004/0178981 | A1 | 9/2004 | Asada et al. | |
| 2004/0217931 | A1 | 11/2004 | Shin | |
| 2005/0017935 | A1 | 1/2005 | Hirama | |
| 2005/0083278 | A1* | 4/2005 | Teraishi | 345/87 |
| 2005/0122321 | A1 | 6/2005 | Akai et al. | |
| 2006/0001628 | A1* | 1/2006 | Kawaguchi | 345/89 |
| 2006/0028463 | A1 | 2/2006 | Nakamura et al. | |
| 2006/0050043 | A1 | 3/2006 | Kawagoe | |
| 2006/0061540 | A1 | 3/2006 | Harada | |
| 2006/0262071 | A1 | 11/2006 | Shieh et al. | |
| 2007/0018923 | A1 | 1/2007 | Yokota | |
| 2007/0030230 | A1 | 2/2007 | Lee | |
| 2008/0001876 | A1 | 1/2008 | Ito et al. | |
| 2010/0066719 | A1* | 3/2010 | Hirao | 345/213 |

FOREIGN PATENT DOCUMENTS

| | | |
|---|---|---|
| EP | 1 424 589 | 6/2004 |
| GB | 2 429 569 | 2/2007 |
| JP | 02-204718 | 8/1990 |
| JP | 2-204718 A | 8/1990 |
| JP | 9-212137 | 8/1997 |
| JP | 9-243998 A | 9/1997 |
| JP | 10-011032 | 1/1998 |
| JP | 11-30975 | 2/1999 |
| JP | 11-085115 | 3/1999 |
| JP | 2000-122596 | 4/2000 |
| JP | 2000-148098 | 5/2000 |
| JP | 2000-267141 | 9/2000 |
| JP | 2001-60078 | 3/2001 |
| JP | 2001-134245 | 5/2001 |
| JP | 2002-62855 | 2/2002 |
| JP | 2002-268613 | 9/2002 |
| JP | 2002-328654 | 11/2002 |
| JP | 2003-022058 | 1/2003 |
| JP | 2003-66918 | 3/2003 |
| JP | 2003-140624 A | 5/2003 |
| JP | 2003-177720 | 6/2003 |
| JP | 2003-255912 | 10/2003 |
| JP | 2003-302951 | 10/2003 |
| JP | 2004-61552 | 2/2004 |
| JP | 2004-279626 | 10/2004 |
| JP | 2004-334171 | 11/2004 |
| JP | 2005-12911 | 5/2005 |
| JP | 2006-047847 | 2/2006 |
| JP | 2006-72078 | 3/2006 |
| JP | 2007-41548 | 2/2007 |

OTHER PUBLICATIONS

European Search Report dated Sep. 29, 2010 for corresponding European Patent Application of a related U.S. Application.

English translation of Chinese Office Actin dated Dec. 16, 2010 for corresponding Chinese Patent Application No. 200780022213.2 of a related U.S. Application.

Supplementary European Search Report dated Dec. 23, 2010 for corresponding European Patent Application of a related U.S. Application.

Office Action by the Japanese Patent Office dated May 31, 2011 for corresponding Japanese Patent Applicaiton JP 61-228491 with machine translation.

Notice of Allowance dated Oct. 7, 2011, issued in co-pending U.S. Appl. No. 11/922,758.

Notice of Allowance dated Apr. 19, 2012, issued in co-pending U.S. Appl. No. 12/226,056.

Notice of Allowance dated Mar. 15, 2012, issued in co-pending U.S. Appl. No. 12/226,605.

Notice of Allowance dated Sep. 23, 2012, issued in co-pending U.S. Appl. No. 12/311,968.

U.S. Office Action dated Sep. 29, 2012, issued in co-pending U.S. Appl. No. 12/226,056.

* cited by examiner

DISPLAY DEVICE, ITS DRIVE CIRCUIT, AND DRIVE METHOD

TECHNICAL FIELD

The present invention relates to a hold type display device such as a liquid crystal display device using switching elements like thin film transistors, and a drive circuit and a drive method for the display device.

BACKGROUND ART

In an impulse type display device such as a CRT (Cathode Ray Tube), when focusing attention on individual pixels, a light-on period during which an image is displayed and a light-off period during which an image is not displayed are alternately repeated. For example, also in a case where display of a moving image is performed, a light-off period is inserted when rewrite of an image for one screen is performed, and thus an afterimage of a moving object does not occur in human vision. Hence, a background and an object can be clearly distinguished from each other and a moving image is viewed without uncomfortable feeling.

On the other hand, in a hold type display device such as a liquid crystal display device using TFTs (Thin Film Transistors), luminance of an individual pixel is determined by a voltage held in each pixel capacitance, and a voltage held in a pixel capacitance is, once having been rewritten, maintained for one frame period. In this manner, in a hold type display device, a voltage to be held in a pixel capacitance as pixel data is, once having been written, held until the next time the voltage is rewritten; as a result, an image of each frame temporally approximates an image of its previous frame. Accordingly, when a moving image is displayed, an afterimage of a moving object occurs in human vision. For example, as shown in FIG. 9, an afterimage AI occurs such that an image OI representing a moving object leaves a trail (such an afterimage is hereinafter referred to as a "trailing afterimage").

In a hold type display device such as an active matrix type liquid crystal display device, such a trailing afterimage occurs when a moving image is displayed, and thus, conventionally it is common to adopt an impulse type display device for a display of a television set, etc., on which moving image display is mainly performed. However, in recent years, there has been a strong demand for reduction in weight and slimming down of a display of a television set, etc., and thus adoption of a hold type display device, such as a liquid crystal display device, that facilitates reduction in weight and slimming down of such a display has rapidly progressed.

Patent Document 1: Japanese Unexamined Patent Publication No. 9-212137

Patent Document 2: Japanese Unexamined Patent Publication No. 9-243998

Patent Document 3: Japanese Unexamined Patent Publication No. 11-30975

Patent Document 4: Japanese Unexamined Patent Publication No. 2003-66918

DISCLOSURE OF THE INVENTION

Problems to be Solved by the Invention

As a method for improving the above-described trailing afterimage in a hold type display device such as an active matrix type liquid crystal display device, a method is known in which display in a liquid crystal display device is made impulse display by, for example, inserting in one frame period a period during which black display is performed (hereinafter, referred to as "black insertion") (e.g., Japanese Unexamined Patent Publication No. 2003-66918 (Patent Document 4)).

However, when impulse is implemented by the conventional method in an active matrix type liquid crystal display device which is a hold type display device, due to black insertion, a drive circuit and the like become complex and the operation frequency of the drive circuit also increases and thus the length of time that can be reserved for charging pixel capacitances is also reduced.

In view of this, it is an object of the present invention to provide a hold type display device, such as an active matrix type liquid crystal display device, that is capable of implementing impulse display while suppressing an increase in complexity of a drive circuit and the like and an increase in operation frequency, and a drive method for the display device.

Means for Solving the Problems

According to a first aspect of the present invention, there is provided an active matrix type display device including:

a plurality of data signal lines;

a plurality of scanning signal lines intersecting the plurality of data signal lines;

a plurality of pixel forming sections arranged in a matrix form correspondingly to respective intersections of the plurality of data signal lines and the plurality of scanning signal lines, each pixel forming section capturing, as a pixel value, a voltage of a data signal line passing through a corresponding intersection when a scanning signal line passing through the corresponding intersection is selected;

a common electrode provided to be shared by the plurality of pixel forming sections;

a data signal line drive circuit for applying a plurality of data signals representing an image to be displayed, to the plurality of data signal lines, respectively, and for inverting polarity of the plurality of data signals every predetermined cycle in each frame period;

a black signal insertion circuit, provided inside or eternal to the data signal line drive circuit, for causing, when the polarity of the plurality of data signals is inverted, a voltage of each data signal line to be a voltage corresponding to black display during a predetermined black signal insertion period; and a scanning signal line drive circuit for applying a scanning signal to each scanning signal line such that each of the plurality of scanning signal lines goes to a selected state at least once during an effective scanning period in each frame period and a scanning signal line brought to a selected state during the effective scanning period goes to a selected state at least once during the black signal insertion period within a period from when a predetermined pixel value holding period has elapsed since the scanning signal line is changed from the selected state to a non-selected state until the scanning signal line goes to a selected state during an effective scanning period in a next frame period, the effective scanning period being a period other than the black signal insertion period.

According to a second aspect of the present invention, in the first aspect of the present invention, the scanning signal line drive circuit causes a scanning signal line brought to a selected state during the effective scanning period to go to a selected state a plurality of times during the black signal insertion periods within a period from when the predetermined pixel value holding period has elapsed since the scanning signal line is changed from the selected state to a non-selected state until the scanning signal line goes to a selected state during an effective scanning period in a next frame period.

According to a third aspect of the present invention, in the first aspect of the present invention, the data signal line drive circuit generates the plurality of data signals such that data signals to be respectively applied to adjacent data signal lines have different polarities, and the black signal insertion circuit causes each data signal line to be short-circuited to a data signal line adjacent thereto during the black signal insertion period.

According to a fourth aspect of the present invention, in the first aspect of the present invention, the black signal insertion circuit causes each data signal line to be short-circuited to the common electrode during the black signal insertion period.

According to a fifth aspect of the present invention, in the first aspect of the present invention, the display device further includes a display control circuit for generating a signal to be provided to the scanning signal line drive circuit, wherein the scanning signal line drive circuit is composed of a plurality of partial circuits and each partial circuit includes:

a shift register having an input terminal and an output terminal for sequentially transferring a pulse to be provided to the input terminal, to the output terminal;

a clock input terminal for a clock signal to be supplied to the shift register;

an output control input terminal for an output control signal for controlling an output of scanning signals to be outputted from the partial circuit; and combinational logic circuits for generating pulse signals corresponding to the scanning signals to be outputted from the partial circuit, based on output signals from respective stages of the shift register, a clock signal to be provided to the clock input terminal, and an output control signal to be provided to the output control input terminal, the plurality of partial circuits are cascade-connected by connecting an input terminal of a shift register in a partial circuit to an output terminal of a shift register in another partial circuit, and the display control circuit provides a predetermined clock signal in common to the clock input terminals of the plurality of partial circuits and provides individual output control signals to the output control input terminals of the plurality of partial circuits, respectively.

According to a sixth aspect of the present invention, in the first aspect of the present invention, the display device further includes a display control circuit for generating a signal to be provided to the scanning signal line drive circuit, wherein the scanning signal line drive circuit is composed of a plurality of partial circuits and each partial circuit includes:

a shift register having an input terminal and an output terminal for sequentially transferring a pulse to be provided to the input terminal, to the output terminal;

a clock input terminal for a clock signal to be supplied to the shift register;

first and second output control input terminals for an output control signal for controlling an output of scanning signals to be outputted from the partial circuit;

a selector switch for selecting any one of two output control signals to be provided to the first and second output control input terminals; and combinational logic circuits for generating pulse signals corresponding to the scanning signals to be outputted from the partial circuit, based on output signals from respective stages of the shift register, a clock signal to be provided to the clock input terminal, and an output control signal selected by the selector switch, the plurality of partial circuits are cascade-connected by connecting an input terminal of a shift register in a partial circuit to an output terminal of a shift register in another partial circuit, and the display control circuit provides a predetermined clock signal in common to the clock input terminals of the plurality of partial circuits, provides a predetermined first output control signal in common to the first output control input terminals of the plurality of partial circuits, and provides a predetermined second output control signal in common to the second output control input terminals of the plurality of partial circuits.

According to a seventh aspect of the present invention, in the first aspect of the present invention, the pixel value holding period is a period corresponding to 50% to 80% of one frame period.

According to an eighth aspect of the present invention, there is provided a scanning signal line drive circuit for an active matrix type display device including a plurality of data signal lines for transmitting a plurality of data signals representing an image to be displayed; a plurality of scanning signal lines intersecting the plurality of data signal lines; and a plurality of pixel forming sections arranged in a matrix form correspondingly to respective intersections of the plurality of data signal lines and the plurality of scanning signal lines, each pixel forming section capturing, as a pixel value, a voltage of a data signal line passing through a corresponding intersection when a scanning signal line passing through the corresponding intersection is selected, wherein the scanning signal line drive circuit applies a scanning signal to each scanning signal line such that each of the plurality of scanning signal lines goes to a selected state at least once during a horizontal scanning period in each frame period and a scanning signal line brought to a selected state during the horizontal scanning period goes to a selected state at least once upon switching horizontal scanning periods during a predetermined period within a period from when a predetermined pixel value holding period has elapsed since the horizontal scanning period until a horizontal scanning period where the scanning signal line goes to a selected state in a next frame period, the horizontal scanning period corresponding to one line of the image.

According to a ninth aspect of the present invention, there is provided a drive method for an active matrix type display device including a plurality of data signal lines; a plurality of scanning signal lines intersecting the plurality of data signal lines; and a plurality of pixel forming sections arranged in a matrix form correspondingly to respective intersections of the plurality of data signal lines and the plurality of scanning signal lines, each pixel forming section capturing, as a pixel value, a voltage of a data signal line passing through a corresponding intersection when a scanning signal line passing through the corresponding intersection is selected, the drive method including:

a data signal line driving step of applying a plurality of data signals representing an image to be displayed, to the plurality of data signal lines, respectively, and inverting polarity of the plurality of data signals every predetermined cycle in each frame period;

a black signal inserting step of causing, when the polarity of the plurality of data signals is inverted, a voltage of each data signal line to be a voltage corresponding to black display during a predetermined black signal insertion period; and a scanning signal line driving step of applying a scanning signal to each scanning signal line such that each of the plurality of scanning signal lines goes to a selected state at least once during an effective scanning period in each frame period and a scanning signal line brought to a selected state during the effective scanning period goes to a selected state at least once during the black signal insertion period within a period from when a predetermined pixel value holding period has elapsed since the scanning signal line is changed from the selected state to a non-selected state until the scanning signal line goes to a selected state during an effective scanning period in a next frame period, the effective scanning period being a period other than the black signal insertion period.

Effects of the Invention

According to the first aspect of the present invention, during a black signal insertion period which is when the polarity of data signals is inverted, the voltage of each data signal line has a value corresponding to black display and each scanning signal line goes to a selected state at least once during the black signal insertion period after the lapse of a predetermined pixel value holding period from when the scanning signal line is selected during an effective scanning period to write a pixel value. Accordingly, a black display period exists until the next time the scanning signal line goes to a selected state during an effective scanning period to write a pixel value, and thus, black insertion of the same length is performed on all display lines and without reducing the charging period for a pixel capacitance for writing a pixel value, by implementing impulse by reserving a sufficient black insertion period, the display quality of a moving image can be improved. In addition, the operating speed of a data signal line drive circuit and the like does not need to be increased for black insertion.

According to the second aspect of the present invention, a scanning signal line brought to a selected state during an effective scanning period is brought to a selected state a plurality of times during black signal insertion periods within a period from when a predetermined pixel value holding period has elapsed since the scanning signal line is changed from the selected state to a non-selected state until the scanning signal line goes to a selected state during an effective scanning period in a next frame period. Accordingly, display luminance can be set to a sufficient black level during a black display period for implementing impulse.

According to the third aspect of the present invention, each data signal line obtains a voltage corresponding to black display by being short-circuited to a data signal line adjacent thereto during a black signal insertion period and based on this voltage black insertion is performed. Accordingly, in a liquid crystal display device of a dot-inversion drive scheme in which in order to reduce power consumption adjacent data signal lines are short-circuited when the polarity of data signals is inverted, impulse can be easily implemented.

According to the fourth aspect of the present invention, each data signal line obtains a voltage corresponding to black display by being short-circuited to a common electrode during a black signal insertion period and based on this voltage black insertion is performed.

Accordingly, in a liquid crystal display device of a scheme in which in order to reduce power consumption each data signal is short-circuited to a common electrode when the polarity of data signals is inverted, impulse can be easily implemented.

According to the fifth aspect of the present invention, by using a plurality of existing gate driver IC chips as partial circuits, appropriately inputting a start pulse signal according to a pixel value write and black voltage application, and appropriately inputting an output control signal to each partial circuit, a scanning signal line drive circuit capable of performing black insertion can be implemented. Accordingly, without newly preparing gate driver IC chips, impulse drive can be easily performed.

According to the sixth aspect of the present invention, by using a plurality of gate driver IC chips each including a selector switch also for an output control signal, as partial circuits, appropriately inputting a start pulse signal according to a pixel value write and black voltage application, inputting two-channel output control signals in common to each partial circuit, and individually controlling the selector switches on a partial-circuit-by-partial-circuit basis, a scanning signal line drive circuit capable of performing black insertion can be implemented. Accordingly, with addition of only small quantities of new circuits, impulse drive can be easily performed.

According to the seventh aspect of the present invention, a period corresponding to 50% to 80% of one frame period can be set as a pixel value holding period and a period corresponding to the remaining 50% to 20% can be set as a black display period. Accordingly, the effect of implementation of impulse can be sufficiently obtained and thus the display quality of a moving image can be surely improved.

DESCRIPTION OF THE SYMBOLS

10: TFT (SWITCHING ELEMENT)
31: BUFFER (VOLTAGE FOLLOWER)
40: SHIFT REGISTER
41 and 43: AND GATE
45: OUTPUT SECTION
47: SELECTOR SWITCH
100: DISPLAY SECTION
200: DISPLAY CONTROL CIRCUIT
300: SOURCE DRIVER (DATA SIGNAL LINE DRIVE CIRCUIT)
400: GATE DRIVER (SCANNING SIGNAL LINE DRIVE CIRCUIT)
411, 412, . . . , 41*q*: GATE DRIVER IC CHIP
421, 422, . . . , 42*q*: GATE DRIVER IC CHIP Cp: PIXEL CAPACITANCE
Ec: COMMON ELECTRODE
SWa: FIRST MOS TRANSISTOR (SWITCHING ELEMENT)
SWb: SECOND MOS TRANSISTOR (SWITCHING ELEMENT)
SLi: SOURCE LINE (DATA SIGNAL LINE) (i=1, 2, . . . , n)
GLj: GATE LINE (SCANNING SIGNAL LINE) (j=1, 2, . . . , m)
DA: DIGITAL IMAGE SIGNAL
SSP: DATA START PULSE SIGNAL
SCK: DATA CLOCK SIGNAL
GSP: GATE START PULSE SIGNAL
GCK: GATE CLOCK SIGNAL
Csh: SHORT-CIRCUIT CONTROL SIGNAL
COE: SWITCHING CONTROL SIGNAL
GOE: GATE DRIVER OUTPUT CONTROL SIGNAL
GOEr: GATE DRIVER OUTPUT CONTROL SIGNAL (r=1, 2, . . . , q)
GOEa and GOEb: GATE DRIVER OUTPUT CONTROL SIGNAL
S(i): DATA SIGNAL (i=1, 2, . . . , n)
G(j): SCANNING SIGNAL (j=1, 2, . . . , m)
Pw: PIXEL DATA WRITE PULSE
Pb: BLACK VOLTAGE APPLICATION PULSE
Thd: PIXEL DATA HOLDING PERIOD (PIXEL VALUE HOLDING PERIOD)
Tbk: BLACK DISPLAY PERIOD
Tsh: SHORT-CIRCUIT PERIOD (BLACK SIGNAL INSERTION PERIOD)

BEST MODE FOR CARRYING OUT THE INVENTION

An embodiment of the present invention will be described below with reference to the accompanying drawings.

<1. Overall Configuration and Operation>

Figure 1:
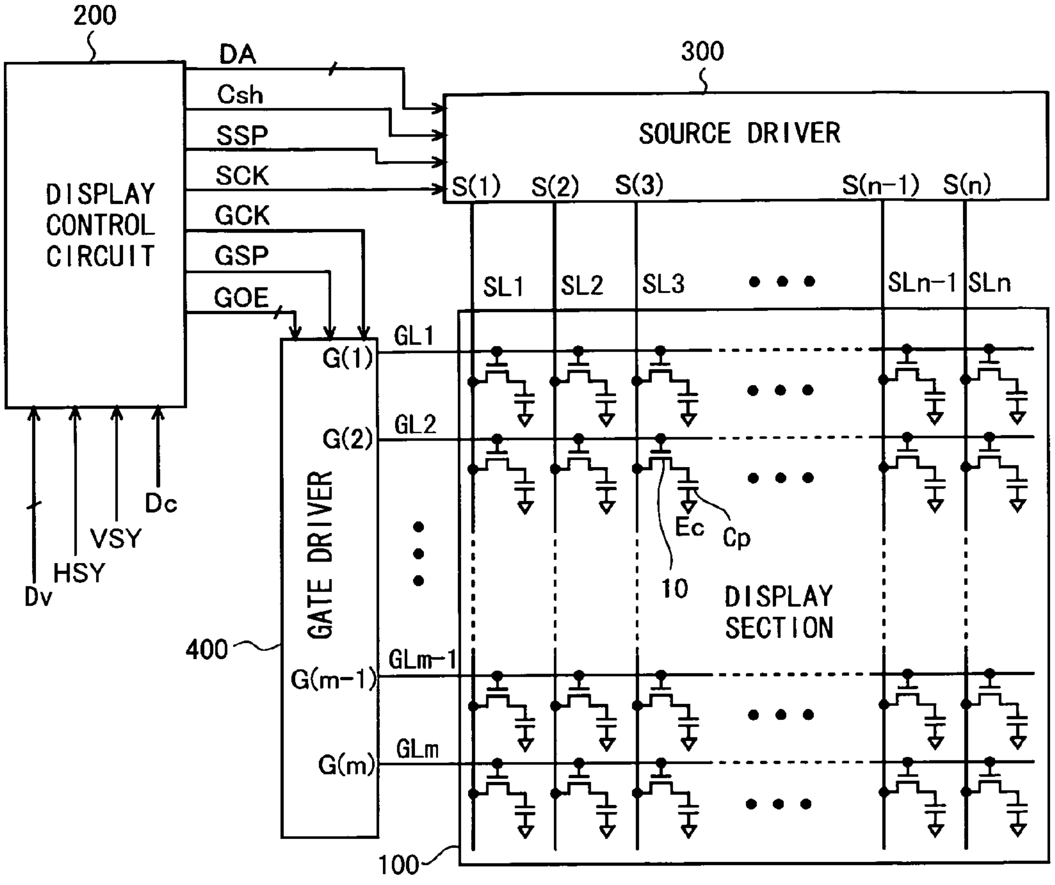
FIG. 1 is a block diagram showing a configuration of a liquid crystal display device according to an embodiment of the present invention, together with an equivalent circuit of a display section of the liquid crystal display device.

FIG. 1 is a block diagram showing a configuration of a liquid crystal display device according to an embodiment of the present invention, together with an equivalent circuit of a display section of the liquid crystal display device. The liquid crystal display device includes a source driver 300 serving as a data signal line drive circuit, a gate driver 400 serving as a scanning signal line drive circuit, an active matrix type display section 100, and a display control circuit 200 for controlling the source driver 300 and the gate driver 400.

The display section 100 in the present embodiment includes a plurality of (m) gate lines GL1 to GLm serving as scanning signal lines; a plurality of (n) source lines SL1 to SLn serving as data signal lines and intersecting the gate lines GL1 to GLm, respectively; and a plurality of (m×n) pixel forming sections provided correspondingly to respective intersections of the gate lines GL1 to GLm and the source lines SL1 to SLn. The pixel forming sections are arranged in a matrix form to configure a pixel array, and each pixel forming section includes a TFT 10 which is a switching element having a gate terminal connected to a gate line GLj passing through a corresponding intersection and having a source terminal connected to a source line SLi passing through the intersection; a pixel electrode connected to a drain terminal of the TFT 10; a common electrode Ec which is a counter electrode provided to be shared by the plurality of pixel forming sections; and a liquid crystal layer provided to be shared by the plurality of pixel forming sections and sandwiched between the pixel electrode and the common electrode Ec. By a liquid crystal capacitance formed by the pixel electrode and the common electrode Ec, a pixel capacitance Cp is composed. Note that although normally in order to surely hold a voltage in a pixel capacitance an auxiliary capacitance is provided in parallel with a liquid crystal capacitance, the auxiliary capacitance is not directly related to the present invention and thus the description and graphic representation thereof are not given.

To a pixel electrode in each pixel forming section a potential according to an image to be displayed is provided by the source driver 300 and the gate driver 400 which operate in a manner described later, and to the common electrode Ec a predetermined potential (referred to as a "common electrode potential") Vcom is provided by a power supply circuit which is not shown. Accordingly, a voltage according to a potential difference between the pixel electrode and the common electrode Ec is applied to a liquid crystal and by the voltage application the amount of light transmission through the liquid crystal layer is controlled, whereby image display is performed. Note that to control the amount of light transmission by voltage application to the liquid crystal layer a polarizing plate is used and it is assumed that in the present embodiment a polarizing plate is arranged so as to obtain normally black mode.

The display control circuit 200 receives from an external signal source a digital video signal Dv representing an image to be displayed, a horizontal synchronizing signal HSY and a vertical synchronizing signal VSY for the digital video signal Dv, and a control signal Dc for controlling a display operation, and generates and outputs, based on the signals Dv, HSY, VSY, and Dc, a data start pulse signal SSP, a data clock signal SCK, a short-circuit control signal Csh, a digital image signal DA (a signal corresponding to the video signal Dv) representing an image to be displayed, a gate start pulse signal GSP, a gate clock signal GCK, and a gate driver output control signal GOE, as signals for displaying the image represented by the digital video signal Dv on the display section 100. More specifically, after timing adjustment and the like are performed on a video signal Dv in an internal memory where necessary, the video signal Dv is outputted as a digital image signal DA from the display control circuit 200. Then, a data clock signal SCK is generated as a signal composed of pulses for respective pixels of an image represented by the digital image signal DA. A data start pulse signal SSP is generated, based on a horizontal synchronizing signal HSY, as a signal that is at a high level (H level) during a predetermined period every horizontal scanning period and a gate start pulse signal GSP is generated, based on a vertical synchronizing signal VSY, as a signal that is at an H level during a predetermined period every frame period (vertical scanning period). A gate clock signal GCK is generated based on the horizontal synchronizing signal HSY and a short-circuit control signal Csh and a gate driver output control signal GOE (GOE1 to GOEq) are generated based on the horizontal synchronizing signal HSY and a control signal Dc.

Of the signals generated in the display control circuit 200 in the above-described manner, the digital image signal DA, the short-circuit control signal Csh, and the start pulse signal SSP and clock signal SCK for the source driver are inputted to the source driver 300 and the start pulse signal GSP and clock signal GCK for the gate driver and the gate driver output control signal GOE are inputted to the gate driver 400.

The source driver 300 sequentially generates, based on the digital image signal DA and the start pulse signal SSP and clock signal SCK for the source driver, data signals S(1) to S(n) every horizontal scanning period, as analog voltages corresponding to pixel values for respective horizontal scanning lines of an image represented by the digital image signal DA and the data signals S(1) to S(n) are applied to the source lines SL1 to SLn, respectively. The source driver 300 in the present embodiment adopts a drive scheme in which the data signals S(1) to S(n) are outputted such that the polarity of a voltage applied to the liquid crystal layer is inverted every frame period and is also inverted every gate line and every source line in each frame, i.e., a dot-inversion drive scheme. Therefore, the source driver 300 inverts the polarity of a voltage applied to the source lines SL1 to SLn every source line and inverts the polarity of a voltage of a data signal S(i) applied to each source line SLi every horizontal scanning period. Here, the potential that serves as a reference for polarity inversion of a voltage applied to the source lines has a direct current level (potential corresponding to a direct current component) of the data signals S(1) to S(n) and the direct current level does not generally match a direct current level of the common electrode Ec and is different from the direct current level of the common electrode Ec by a level shift (field-through voltage) ΔVd caused by a parasitic capacitance Cgd between a gate and a drain of a TFT in each pixel forming section. Note, however, that when the level shift ΔVd caused by the parasitic capacitance Cgd is sufficiently small relative to an optical threshold voltage Vth of a liquid crystal the direct current level of the data signals S(1) to S(n) can be considered to be equal to the direct current level of the common electrode Ec, and thus, it may be considered that the polarity of the data signals S(1) to S(n), i.e., the polarity of a voltage applied to the source lines, is inverted every horizontal scanning period with the potential of the common electrode Ec as a reference.

Figure 2:
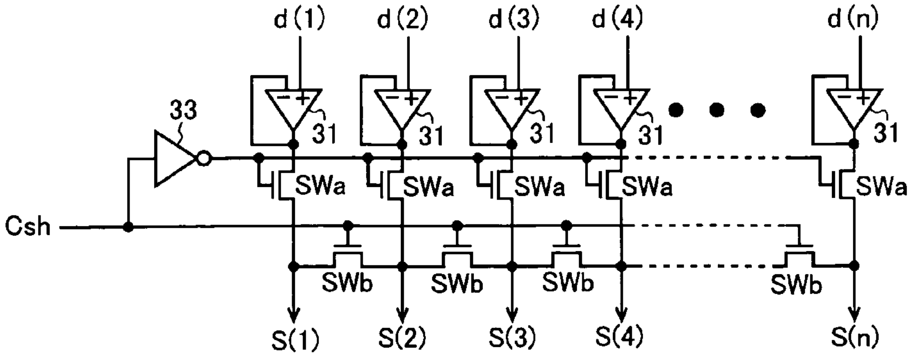
FIG. 2 is a circuit diagram showing an exemplary configuration of an output section of a source driver in the embodiment.

The source driver 300 also adopts a charge sharing scheme in which in order to reduce power consumption adjacent source lines are short-circuited when the polarity of the data signals S(1) to S(n) is inverted. Therefore, an output section which is a portion of the source driver 300 that outputs the data signals S(1) to S(n) is configured as shown in FIG. 2. Specifically, the output section receives analog voltage signals d(1) to d(n) generated based on a digital image signal DA and performs an impedance conversion on the analog voltage signals d(1) to d(n) and thereby generates data signals S(1) to S(n) as video signals to be transmitted by the source lines SL1 to SLn, and has n buffers 31 as voltage followers for the impedance conversion. To an output terminal of each buffer 31 is connected a first MOS transistor SWa serving as a switching element, and a data signal S(i) from each buffer 31 is outputted from an output terminal of the source driver 300 through a first MOS transistor SWa (i=1, 2, . . . , n). Adjacent output terminals of the source driver 300 are connected by a second MOS transistor SWb serving as a switching element. To a gate terminal of the second MOS transistor SWb between the output terminals is provided a short-circuit control signal Csh, and to a gate terminal of the first MOS transistor SWa connected to the output terminal of each buffer 31 is provided an output signal from an inverter 33, i.e., a logically inverted signal of the short-circuit control signal Csh. Hence, when the short-circuit control signal Csh is non-active (at a low level), the first MOS transistors SWa are turned on and the second MOS transistors SWb are turned off and thus a data signal from each buffer 31 is outputted from the source driver 300 through a corresponding first MOS transistor SWa. On the other hand, when the short-circuit control signal Csh is active (at a high level) the first MOS transistors SWa are turned off and the second MOS transistors SWb are turned on and thus a data signal from each buffer 31 is not outputted and adjacent source lines in the display section 100 are short-circuited through the second MOS transistors SWb.

In the source driver 300 in the present embodiment, as shown in FIG. 3(A), an analog voltage signal d(i) is generated as a video signal whose polarity is inverted every horizontal scanning period (1H) and in the display control circuit 200, as shown in FIG. 3(B), a short-circuit control signal Csh is generated which is at a high level (H level) during a predetermined period (a short period of the order of one horizontal blanking period) Tsh when the polarity of each analog voltage signal d(i) is inverted (a period during which the short-circuit control signal Csh is at an H level is hereinafter referred to as a "short-circuit period"). As described above, when the short-circuit control signal Csh is at a low level (L level), each analog voltage signal d(i) is outputted as a data signal S(i) and when the short-circuit control signal Csh is at an H level, adjacent source lines are short-circuited to each other. Since in the present embodiment the dot-inversion drive is adopted, the voltages of adjacent source lines have opposite polarities to each other and moreover the absolute values of the voltages are substantially equal to each other. Therefore, the value of each data signal S(i), i.e., the voltage of each source line SLi, is a voltage corresponding to black display (which may also be simply referred to as a "black voltage") during the short-circuit period Tsh. In the present embodiment, the polarity of each data signal S(i) is inverted with a direct current level VSdc of the data signal S(i) as a reference and thus, as shown in FIG. 3(C), during the short-circuit period. Tsh, the level of each data signal S(i) is substantially equal to the direct current level VSdc of the data signal S(i). Note that the configuration in which adjacent source lines are thus short-circuited when the polarity of data signals is inverted, whereby the voltage of each source line is made substantially equal to a black voltage (the direct current level VSdc of the data signals S(i) or the common electrode potential Vcom) has been conventionally proposed as a means of reducing power consumption (see Japanese Unexamined Patent Publication No. 9-212137 (Patent Document 1), Japanese Unexamined Patent Publication No. 9-243998 (Patent Document 2), and Japanese Unexamined Patent Publication No. 11-30975 (Patent Document 3), for example) and thus the configuration is not limited to the one shown in FIG. 2.

The gate driver 400 sequentially selects, based on the start pulse signal GSP and clock signal GCK for the gate driver and a gate driver output control signal GOEr (r=1, 2, . . . q), the gate lines GL1 to GLm substantially every horizontal scanning period in each frame period (each vertical scanning period) of the digital image signal DA, so as to write data signals S(1) to S(n) into (the pixel capacitances of) their corresponding pixel forming sections, and selects a gate line GLj (j=1 to m) during a predetermined period when the polarity of data signals S(i) (i=1 to n) is inverted, so as to perform black insertion which will be described later. Specifically, the gate driver 400 applies scanning signals G(1) to G(m) each including a pixel data write pulse Pw and black voltage application pulses Pb, such as those shown in FIGS. 3(D) and 3(E), to the gate lines GL1 to GLm, respectively, and a gate line GLj to which the pulses Pw and Pb are applied goes to a selected state and a TFT 10 connected to the gate line GLj being in the selected state goes to an on state (a TFT 10 connected to a gate line in a non-selected state goes to an off state). Here, the pixel data write pulse Pw is at an H level during an effective scanning period of a horizontal scanning period (1H) corresponding to a display period, whereas the black voltage application pulse Pb is at an H level during a short-circuit period Tsh of a horizontal scanning period (1H) corresponding to a blanking period. In the present embodiment, as shown in FIGS. 3(D) and 3(E), in each scanning signal G(j), the time interval between a pixel data write pulse Pw and a black voltage application pulse Pb which is the first one to appear after the pixel data write pulse Pw is a ⅔ frame period and three black voltage application pulses Pb successively appear in one frame period (1V) at intervals of one horizontal scanning period (1H)

Figure 3:
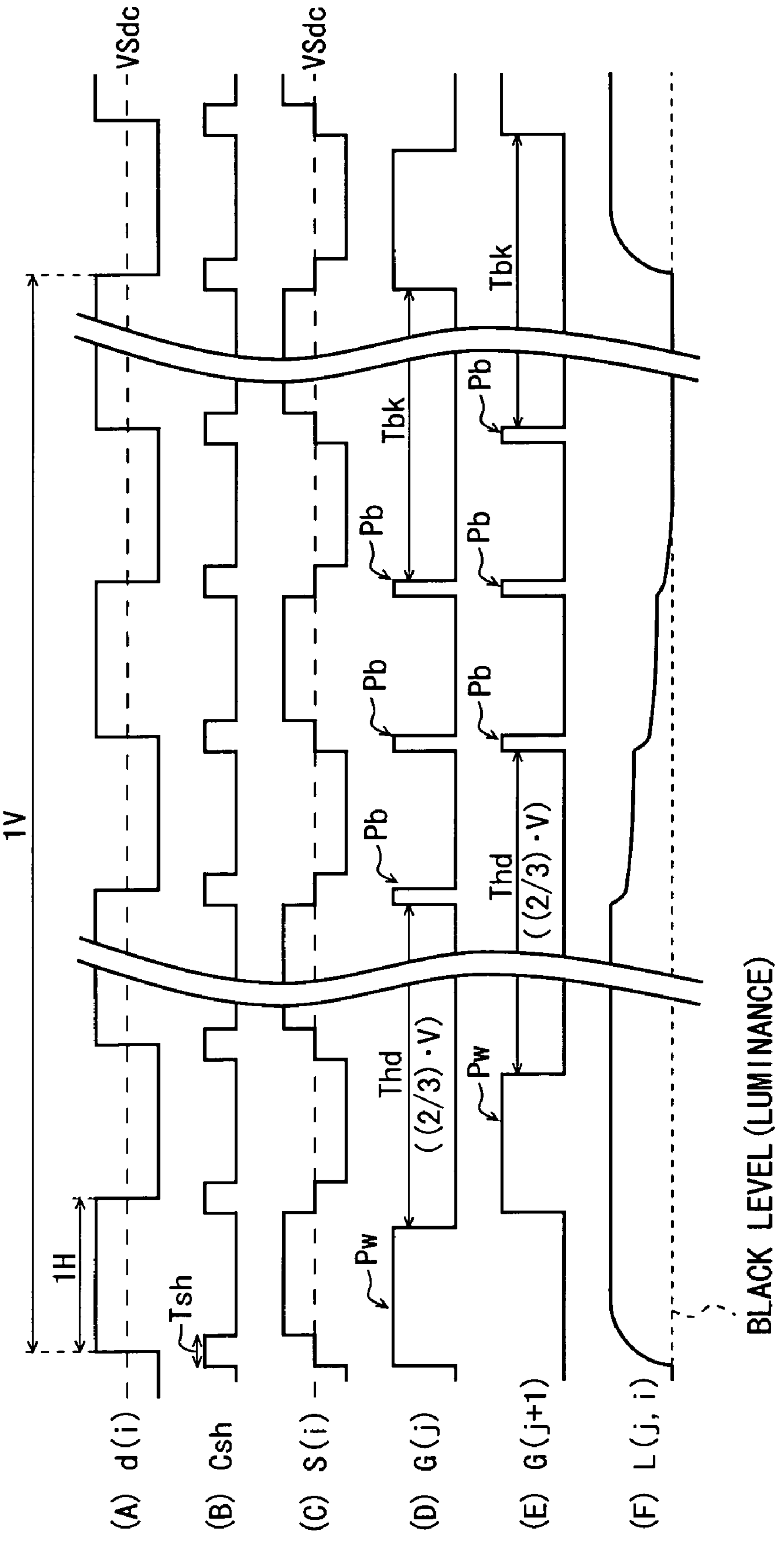
FIGS. 3(A) to 3(F) are signal waveform diagrams for describing the operation of the liquid crystal display device according to the embodiment.

Next, with reference to FIG. 3, the drive of the display section 100 (see FIG. 1) by the above-described source driver 300 and gate driver 400 will be described. In each pixel forming section in the display section 100, by a pixel data write pulse Pw being applied to a gate line GLj connected to a gate terminal of a TFT 10 included in the pixel forming section, the TFT 10 is turned on and a voltage of a source line SLi connected to a source terminal of the TFT 10 is written into the pixel forming section as a value of a data signal S(i). That is, the voltage of the source line SLi is held in a pixel capacitance Cp. Thereafter, the gate line GLj goes, to a non-selected state during a period Thd which is before a black voltage application pulse Pb appears, and thus, the voltage written into the pixel forming section is held as it is. A black voltage application pulse Pb is applied to the gate line GLj during a short-circuit period Tsh which is after the period of the non-selected state (hereinafter, referred to as a "pixel data holding period") Thd. As described above, during the short-circuit period Tsh, a value of each data signal S(i), i.e., a voltage of each source line SLi, is substantially equal to a direct current level of the data signal S(i) (i.e., a black voltage). Thus, by the application of the black voltage application pulse Pb to the gate line GLj, the voltage held in the pixel capacitance Cp of the pixel forming section changes toward a black voltage. However, since the pulse width of the black voltage application pulse Pb is short, in order to surely make the voltage held in the pixel capacitance Cp a black voltage, as shown in FIGS. 3(D) and 3(E), three black voltage application pulses Pb are successively applied to the gate line GLj in each frame period at intervals of one horizontal scanning period (1H). Accordingly, luminance (the amount of transmitted light to be determined by a voltage held in a pixel capacitance) L (j, i) of a pixel formed by the pixel forming section connected to the gate line GLj changes in the manner shown in FIG. 3(F). Accordingly, in one display line corresponding to pixel forming sections connected to each gate line GLj, during a pixel data holding period Thd, display based on a digital image signal DA is performed and during a period Tbk from when the above-described three black voltage application pulses Pb have been applied after the display until the next time a pixel data write pulse Pw is applied to the gate line GLj, black display is performed. By the period during which black display is performed (hereinafter, referred to as a "black display period") Tbk being thus inserted in each frame period, implementation of impulse display by the liquid crystal display device is performed.

As can also be seen from FIGS. 3(D) and 3(E), since the point in time when a pixel data write pulse Pw appears is shifted by one horizontal scanning period (1H) on each scanning signal G(j), the point in time when a black voltage application pulse Pb appears is also shifted by one horizontal scanning period (1H) on each scanning signal G(j). Accordingly, black insertion of the same length is performed on all display lines such that a black display period Tbk is also shifted by one horizontal scanning period (1H) on each display line. In this manner, without reducing the charging period for a pixel capacitance Cp for writing pixel data, a sufficient black insertion period is reserved. In addition, the operating speed of the source driver 300 and the like does not need to be increased for black insertion.

<2. Configuration of Gate Driver>

<2.1 First Exemplary Configuration>

Figure 4:
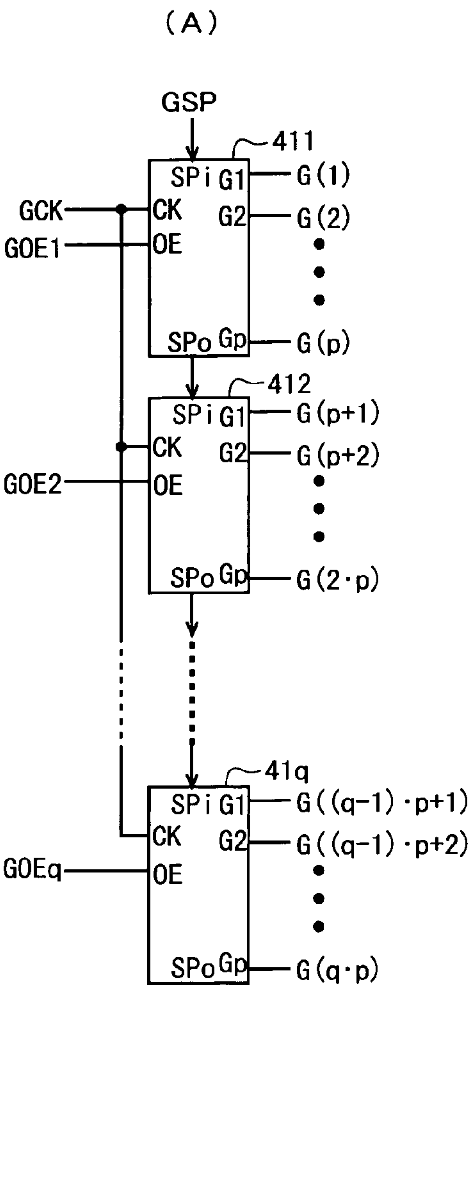
FIGS. 4(A) and 4(B) are block diagrams showing a first exemplary configuration of a gate driver in the embodiment.
Figure 4:
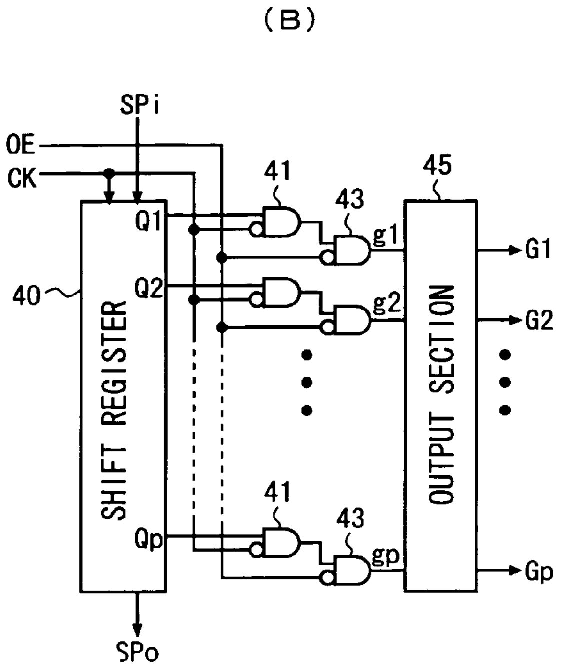

FIGS. 4(A) and 4(B) are block diagrams showing a first exemplary configuration of the gate driver 400 that operates in the manner shown in FIGS. 3(D) and 3(E). The gate driver 400 of the exemplary configuration is composed of a plurality of (q) gate driver IC (Integrated Circuit) chips 411, 412, . . . , 41*q* each including a shift register, which serve as partial circuits.

Each gate driver IC chip includes, as shown in FIG. 4(B), a shift register 40, first and second AND gates 41 and 43 provided for each stage of the shift register 40, and an output section 45 that outputs scanning signals G1 to Gp based on output signals g1 to gp from the second AND gates 43, and receives from an outside source a start pulse signal SPi, a clock signal CK, and an output control signal OE. The start pulse signal SPi is provided to an input terminal of the shift register 40, and from an output terminal of the shift register 40 is outputted a start pulse signal SPo to be inputted to a subsequent gate driver IC chip. To each of the first AND gates 41 is inputted a logically inverted signal of the clock signal CK, and to each of the second AND gates 43 is inputted a logically inverted signal of the output control signal OE. An output signal Qk (k=1 to p) from each stage of the shift register 40 is inputted to a first AND gate 41 provided for the stage and an output signal from the first AND gate 41 is inputted to a second AND gate 43 provided for the stage.

The gate driver 400 of the present exemplary configuration is, as shown in FIG. 4(A), implemented by the plurality of (q) gate driver IC chips 411 to 41*q* of the above-described configuration being cascade-connected to one another. Specifically, an output terminal (an output terminal for a start pulse signal SPo) of a shift register in each gate driver IC chip is connected to an input terminal (an input terminal for a start pulse signal SPi) of a shift register in a subsequent gate driver IC chip such that the shift registers 40 in the gate driver IC chips 411 to 41*q* form one shift register (the shift registers thus formed by cascade connection are hereinafter referred to as "coupled shift registers"). Note, however, to an input terminal of a shift register in the first gate driver IC chip 411 a gate start pulse signal GSP is inputted from the display control circuit 200, and an output terminal of a shift register in the last gate driver IC chip 41*q* is not connected to an outside source. Note also that a gate clock signal GCK from the display control circuit 200 is inputted in common to each of the gate driver IC chips 411 to 41*q* as a clock signal CK. On the other hand, a gate driver output control signal GOE generated in the display control circuit 200 is composed of first to qth gate driver output control signals GOE1 to GOEq and the gate driver output control signals GOE1 to GOEq are individually inputted to the gate driver IC chips 411 to 41*q*, respectively, as output control signals OE.

Figure 5:
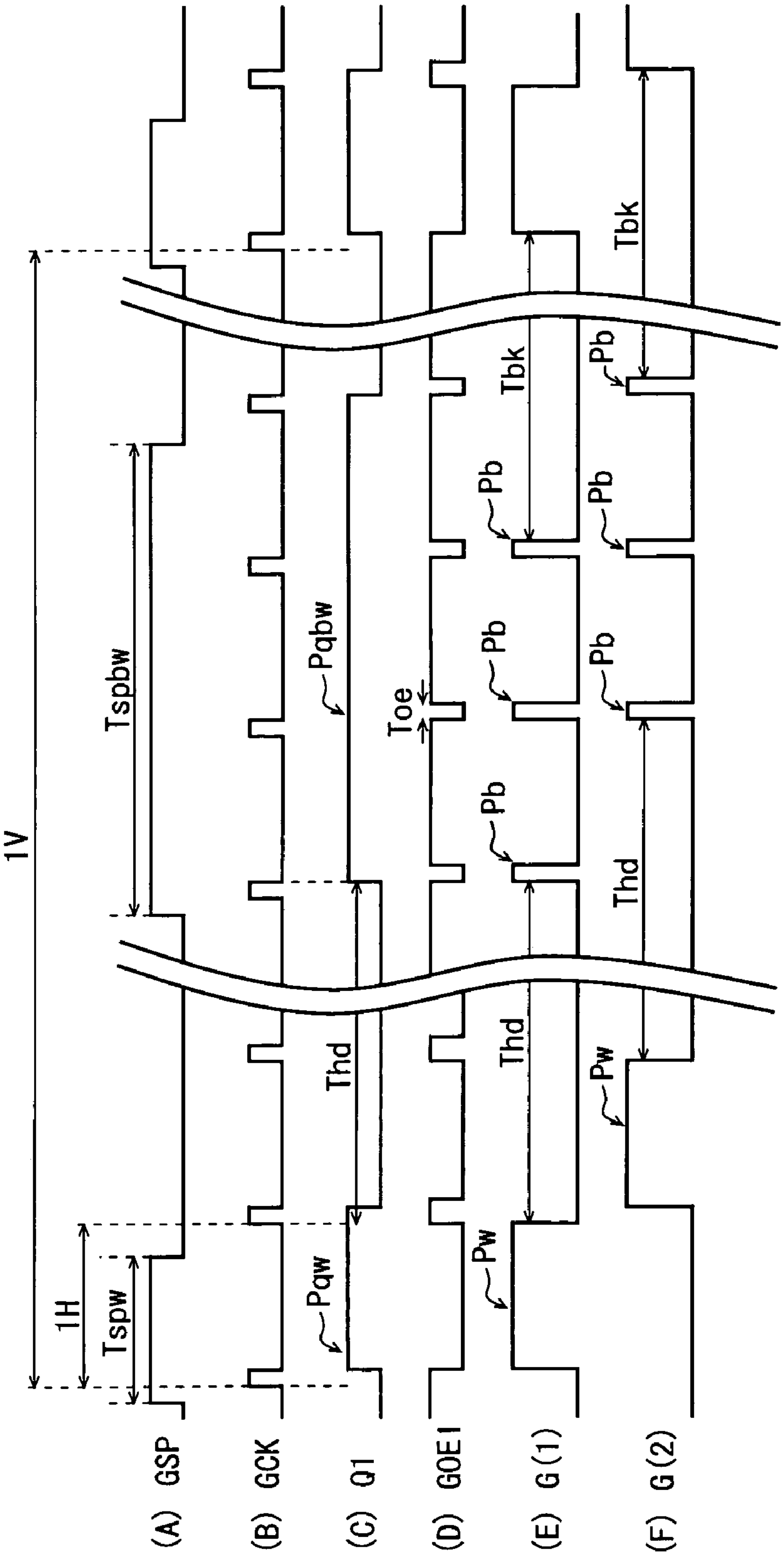
FIGS. 5(A) to 5(F) are signal waveform diagrams for describing the operation of the gate driver of the first exemplary configuration.

Next, with reference to FIG. 5, the operation of the gate driver 400 of the above-described first exemplary configuration will be described. The display control circuit 200 generates, as a gate start pulse signal GSP, as shown in FIG. 5(A), a signal that is at an H level (active) during a period Tspw where a pixel data write pulse Pw appears and a period Tspbw where three black voltage application pulses Pb appear and generates, as shown in FIG. 5(B), a gate clock signal GCK which is at an H level during a predetermined period every horizontal scanning period (1H). When such a gate start pulse signal GSP and a gate clock signal GCK are inputted to the gate driver 400 in FIG. 4, a signal such as the one shown in FIG. 5(C) is outputted as an output signal Q1 from the first stage of the shift register 40 in the first gate driver IC chip 411. The output signal Q1 includes, in each frame period, one pulse Pqw corresponding to a pixel data write pulse Pw and one pulse Pqbw corresponding to three black voltage application pulses Pb and the two pulses Pqw and Pqbw are spaced apart by substantially a pixel data holding period Thd. Such two pulses Pqw and Pqbw are sequentially transferred through the coupled shift registers in the gate driver 400, according to the gate clock signal GCK. Accordingly, from each stage of the coupled shift registers a signal having a waveform, such as the one shown in FIG. 5(C), is sequentially outputted so as to be shifted by one horizontal scanning period (1H).

The display control circuit 200 also generates, as described above, gate driver output control signals GOE1 to GOEq to be provided to the gate driver IC chips 411 to 41*q* composing the gate driver 400. Here, a gate driver output control signal GOEr to be provided to an rth gate driver IC chip 41*r* is at an L level during a period where a pulse Pqw corresponding to a pixel data write pulse Pw is outputted from any one of the stages of a shift register 40 in the gate driver IC chip 41*r*, except that the gate driver output control signal GOEr is at an H level for adjustment of the pixel data write pulse Pw during a predetermined period near a pulse of the gate clock signal GCK, and during the other period the gate driver output control signal GOEr is at an H level except that the gate driver output control signal GOEr is at an L level during a predetermined period Toe (the predetermined period Toe is set so as to be included in a short-circuit period Tsh) which is immediately after the gate clock signal GCK is changed to an L level from an H level. For example, a gate driver output control signal GOE1, such as the one shown in FIG. 5(D), is provided to the first gate driver IC chip 411. Note that a pulse that is included in the gate driver output control signals GOE1 to GOEq for adjustment of a pixel data write pulse Pw (which corresponds to that the pulse is at an H level during the above-described predetermined period and which is hereinafter referred to as a “write period adjustment pulse”) rises earlier than the rise of the gate clock signal GCK or falls later than the fall of the gate clock signal GCK, according to a necessary pixel data write pulse Pw. Alternatively, without using such a write period adjustment pulse, a pixel data write pulse Pw may be adjusted only by the gate clock signal GCK.

In each gate driver IC chip 41*r* (r=1 to q), based on output signals Qk (k=1 to p) from the respective stages of a shift register 40, a gate clock signal GCK, and a gate driver output control signal GOEr, such as those described above, internal scanning signals g1 to gp are generated by first and second AND gates 41 and 43 and the internal scanning signals g1 to gp are level-converted by an output section 45, whereby scanning signals G1 to Gp to be applied to gate lines are outputted. Accordingly, as shown in FIGS. 5(E) and 5(F), a pixel data write pulse Pw is sequentially applied to the gate lines GL1 to GLm, and in each gate line GLj (j=1 to m) a black voltage application pulse Pb is applied at the point in time when a pixel data holding period Thd has elapsed since the pixel data write pulse is applied, and thereafter, two black voltage application pulses Pb are applied at intervals of one horizontal scanning period (1H). After the three black voltage application pulses Pb are thus applied, an L level is maintained until a pixel data write pulse Pw for a next frame period is applied. That is to say, a black display period Tbk exists during a period from when the above-described three black voltage application pulses Pb have been applied until a next pixel data write pulse Pw is applied.

In the above-described manner, by the gate driver 400 of the configuration shown in FIGS. 4(A) and 4(B), impulse drive, such as that shown in FIGS. 3(C) to 3(F), can be implemented in the liquid crystal display device.

<2.2 Second Exemplary Configuration>

Figure 6:
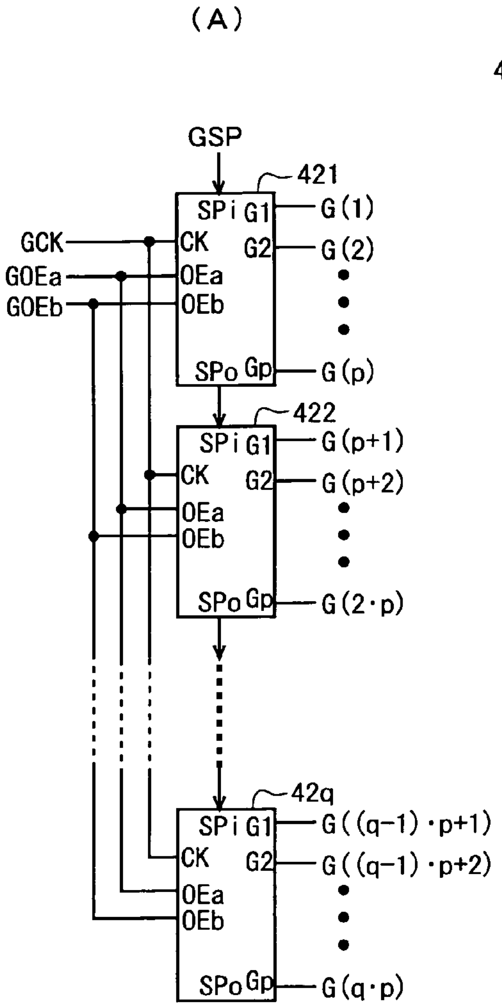
FIGS. 6(A) and 6(B) are block diagrams showing a second exemplary configuration of the gate driver in the embodiment.
Figure 6:
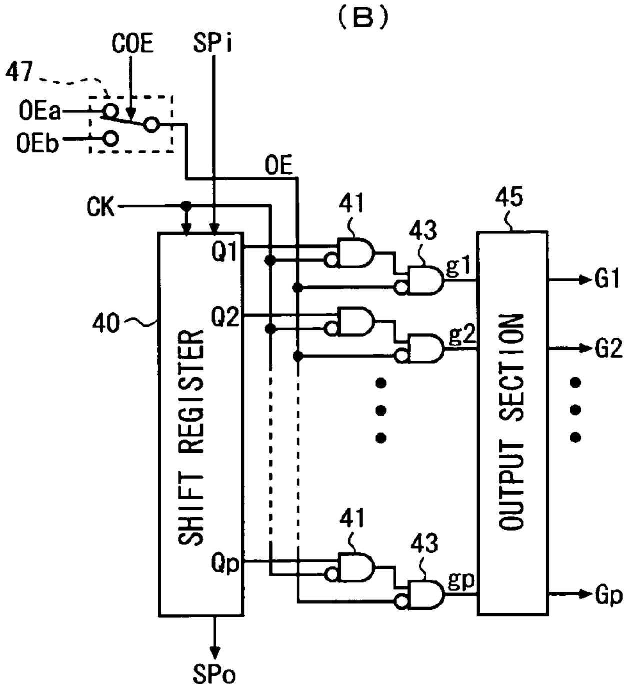

FIGS. 6(A) and 6(B) are block diagrams showing a second exemplary configuration of the gate driver 400 that operates in the manner shown in FIGS. 3(D) and 3(E). The gate driver 400 of the exemplary configuration is also composed of a plurality of (q) gate driver IC chips 421, 422, . . . , 42*q* each including a shift register, which serve as partial circuits.

Each gate driver IC chip is configured in the manner shown in FIG. 6(B). In the present exemplary configuration, unlike the first exemplary configuration in which one output control signal OE is received from an outside source, two-channel output control signals including a first output control signal OEa and a second output control signal OEb are received from an outside source. The gate driver IC chips according to the present exemplary configuration each include a selector switch 47 and first and second output control signals OEa and OEb are inputted to the selector switch 47. The selector switch 47 selects, based on a predetermined switching control signal COE, first and second output control signals OEa and OEb during first and second periods, respectively, which are determined in advance for the gate driver IC chip and outputs each of the first and second output control signals OEa and OEb as an output control signal OE, and a logically inverted signal of the output control signal OE is inputted to each of second AND gates 43 as in the first exemplary configuration. A switching control signal COE is generated in each gate driver IC chip 42*r* based on another internal signal or generated in the display control circuit 200 as a control signal for each gate driver IC chip 42*r* (r=1 to q). A specific signal waveform of the switching control signal COE will be described later. Other configuration of the gate driver IC chips according to the present exemplary configuration is the same as that of the gate driver IC chips according to the first exemplary configuration shown in FIG. 4(B) and thus the same parts are denoted by the same symbols and description thereof is not repeated.

As shown in FIG. 6(A), the gate driver 400 of the present exemplary configuration is also implemented by the plurality of (q) gate driver IC chips 421 to 42*q* of the above-described configuration being cascade-connected to one another, and shift registers in the gate driver IC chips 421 to 42*q* are cascade-connected to one another to form one shift register (hereinafter, referred to as “coupled shift registers” as in a case of the first exemplary configuration). In the present exemplary configuration, a gate clock signal GCK from the display control circuit 200 is inputted in common to each of the gate driver IC chips 421 to 42*q* as a clock signal CK. However, in a case of the present exemplary configuration, unlike in a case of the first exemplary configuration, in the display control circuit 200, as a gate driver output control signal GOE, a first gate driver output control signal GOEa such as the one shown in FIG. 7(D) and a second gate driver output control signal GOEb such as the one shown in FIG. 7(E) are generated in the display control circuit 200, and the two-channel gate driver output control signals GOEa and GOEb are inputted in common to each of the gate driver IC chips 421 to 42*q* as output control signals OEa and OEb. Other configuration of the gate driver 400 of the present exemplary configuration is the same as that of the first exemplary configuration and thus detailed description thereof is not repeated.

Figure 7:
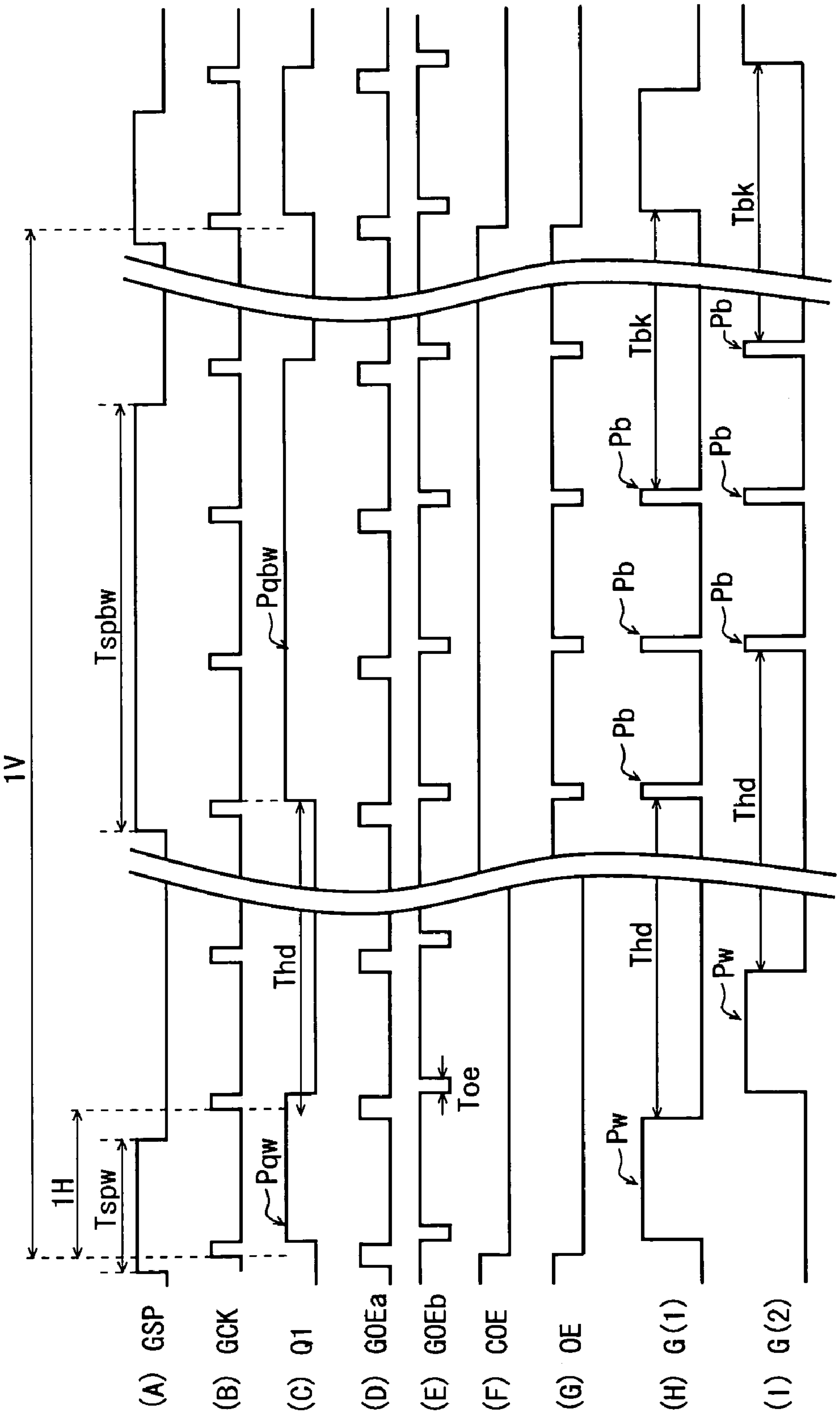
FIGS. 7(A) to 7(I) are signal waveform diagrams for describing the operation of the gate driver of the second exemplary configuration.

Next, with reference to FIG. 7, the operation of the gate driver 400 of the above-described second exemplary configuration will be described. Also in the present exemplary configuration as in the first exemplary configuration, a gate start pulse signal GSP and a gate clock signal GCK as shown in FIGS. 7(A) and 7(B) are provided to the gate driver 400, and output signals from the respective stages of the coupled shift registers formed by cascade connection of the shift registers 400 in the respective gate driver IC chips 42*r* (r=1 to q) are also the same as those in a case of the first exemplary configuration. For example, an output signal Q1 from the first stage of a shift register 40 in the first gate driver IC chip 421 is a signal such as the one shown in FIG. 7(C).

Here, a first gate driver output control signal GOEa is a signal that is at an H level for adjustment of a pixel data write pulse Pw during a predetermined period near a pulse of the gate clock signal GCK and is at an L level during the other period. On the other hand, a second gate driver output control signal GOEb is a signal that is at an L level during a predetermined period Toe (the predetermined period Toe is set so as to be included in a short-circuit period Tsh) which is immediately after the gate clock signal GCK is changed to an L level from an H level, and is at an H level during the other period. Therefore, when a first gate driver output control signal GOEa is selected as an internal output control signal OE by a selector switch 47 of each gate driver IC chip 42*r*, by the configuration shown in FIG. 6(B), as a scanning signal Gk corresponding to an output signal Qk which is at an H level among output signals Q1 to Qp from the respective stages of the shift register 40, a pixel data write pulse Pw which is a pulse whose width is substantially equal to one horizontal scanning period (1H) is generated. On the other hand, when a second gate driver output control signal GOEb is selected as an internal output control signal OE, as a scanning signal Gk corresponding to an output signal Qk which is at an H level among output signals Q1 to Qp from the respective stages of the shift register 40, a black voltage application pulse Pb which is a pulse whose width is equal to the above-described predetermined period Toe is generated. Note that a pulse that is included in the first gate driver output control signal GOEa for adjustment of a pixel data write pulse Pw (which corresponds to that the pulse is at an H level during the above-described predetermined period and which is hereinafter referred to as a “write period adjustment pulse”) rises earlier than the rise of the gate clock signal GCK or falls later than the fall of the gate clock signal GCK, according to a necessary pixel data write pulse Pw. Alternatively, without using such a write period adjustment pulse, the first gate driver output control signal GOEa may be fixed to an L level and a pixel data write pulse Pw may be adjusted only by the gate clock signal GCK.

A selector switch 47 of each gate driver IC chip 42*r* (r=1 to q) selects and outputs a first gate driver output control signal GOEa when a switching control signal COE is at an L level, and selects and outputs a second gate driver output control signal GOEb when a switching control signal COE is at an H level. A switching control signal COE provided to the selector switch 47 of each gate driver IC chip 42*r* (r=1 to q) is at an L level during a period where a pulse Pqw corresponding to a pixel data write pulse Pw is outputted from any one of the stages of a shift register 40 in the gate driver IC chip 42*r*, and is at an H level during the other period. Hence, a switching control signal COE differs from gate driver IC chip to gate driver IC chip; for example, a switching control signal COE to be provided to a selector switch 47 of the first gate driver IC chip 421 is a signal such as the one shown in FIG. 7(F) On the other hand, as shown in FIG. 7(C), an output signal Qk (k=1 to p) from each stage of a shift register 40 in each gate driver IC chip 42*r* includes, in each frame period, one pulse Pqw corresponding to a pixel data write pulse Pw and one pulse Pqbw corresponding to three black voltage application pulses Pb and the two pulses Pqw and Pqbw are spaced apart by substantially a pixel data holding period Thd. Such two pulses Pqw and Pqbw are sequentially transferred to the coupled shift registers in the gate driver 400, according to a gate clock signal GCK. Accordingly, from each stage of the coupled shift registers a signal having a waveform, such as the one shown in FIG. 7(C), is sequentially outputted so as to be shifted by one horizontal scanning period.

In each gate driver IC chip 42*r* (r=1 to q), based on output signals Qk (k=1 to p) from the respective stages of a shift register 40, a gate clock signal GCK, and an output control signal OE which is selected by a selector switch 47, such as those described above, internal scanning signals g1 to gp are generated by first and second AND gates 41 and 43 and the internal scanning signals g1 to gp are level-converted by an output section 45, whereby scanning signals G1 to Gp to be applied to gate lines are outputted. Accordingly, as in the first exemplary configuration, as shown in FIGS. 7(*h*) and 7(*i*) a pixel data write pulse Pw is sequentially applied to the gate lines GL1 to GLm, and in each gate line GLj (j=1 to m) a black voltage application pulse Pb is applied at the point in time when a pixel data holding period Thd has elapsed since, the pixel data write pulse Pw is applied, and thereafter, two black voltage application pulses Pb are applied at intervals of one horizontal scanning period. After the three black voltage application pulses Pb are thus applied, an L level is maintained until a pixel data write pulse PW for a next frame period is applied. That is to say, a black display period Tbk exists during a period from when the above-described three black voltage application pulses Pb have been applied until a next pixel data write pulse Pw is applied.

In the above-described manner, also by the gate driver 400 of the configuration shown in FIGS. 6(A) and 6(B), impulse drive, such as that shown in FIGS. 3(C) to 3(F), can be implemented in the liquid crystal display device.

<3. Effects>

As described above, according to the present embodiment, during each short-circuit period Tsh which is when the polarity of data signals S(i) is inverted, the voltage of each source line SLi has a value corresponding to black display (FIG. 3(C)), and to each gate line GLj three black voltage application pulses Pb each are applied during a short-circuit period Tsh at intervals of one horizontal scanning period after the lapse of a pixel data holding period Thd with a length of a ⅔ frame period from the application of a pixel data write pulse Pw (FIGS. 3(D) and 3(E)). Accordingly, a black display period Tbk exists until the next time a pixel data write pulse Pw is applied and thus black insertion of the order of substantially a ⅓ frame period is performed for each frame. That is, black insertion of the same length is performed on all display lines such that a black display period Tbk for implementing impulse drive is shifted by one horizontal scanning period (1H) on each display line (FIGS. 3(D) and 3(E)). Accordingly, without reducing the charging period for a pixel capacitance Cp for writing pixel data, a sufficient black insertion period is reserved, and moreover, the operating speed of the source driver 300 and the like does not need to be increased for black insertion.

Although in the above-described embodiment three black voltage application pulses Pb are applied to each gate line GLj for each frame period, the number of black, voltage application pulses Pb for one frame period is not limited to three and can be any as long as the number allows display to have a black level. As can be seen from FIG. 3(F), by changing the number of black voltage application pulses Pb for one frame period, the black level (display luminance) during a black display period Tbk can be set to a desired value. Note that the number of black voltage application pulses Pb for one frame period can be easily adjusted by changing the setting of a period Tspbw of a gate start pulse signal GSP (FIG. 5(A) and FIG. 7(A)).

Although in the above-described embodiment a black voltage application pulse Pb is applied to each gate line GLj at the point in time when a pixel data holding period Thd with a length of a ⅔ frame period has elapsed since a pixel data write pulse Pw is applied (FIGS. 3(D) and 3(E)) and black insertion of the order of substantially a ⅓ frame period is performed for each frame, a black display period Tbk is not limited to a ⅓ frame period. Extending the black display period Tbk increases the effect of implementation of impulse and thus is effective in improving the display quality of a moving image (suppressing a trailing afterimage, etc.) but results in reduction in display luminance, and thus, an appropriate black display period Tbk is to be set taking into account the effect of implementation of impulse and display luminance. Note, however, that in order to sufficiently obtain the effect of implementation of impulse a black insertion period is preferably 50% to 20% of one frame period. According to the above-described embodiment, by changing timing at which a black voltage application pulse appears by changing a pixel data holding period Thd by the setting of a gate start pulse signal GSP, a black display period Tbk can be easily adjusted (FIGS. 5 and 7).

In the above-described embodiment, when adopting a gate driver 400 of the first exemplary configuration, as can be seen from FIG. 4(A), only by using a plurality of existing gate driver IC chips and appropriately setting gate driver output control signals GOEr (r=1 to q) to be inputted to the respective gate driver IC chips, impulse drive can be implemented. When adopting a gate driver 400 of the second exemplary configuration, as can be seen from FIGS. 6(A) and 6(B) only by using a plurality of existing gate driver IC chips, preparing two-channel gate driver output control signals GOEa and GOEb, and adding small quantities of circuits such as selector switches 47 to the respective gate driver IC chips, impulse drive can be implemented.

<4. Variant>

Figure 8:
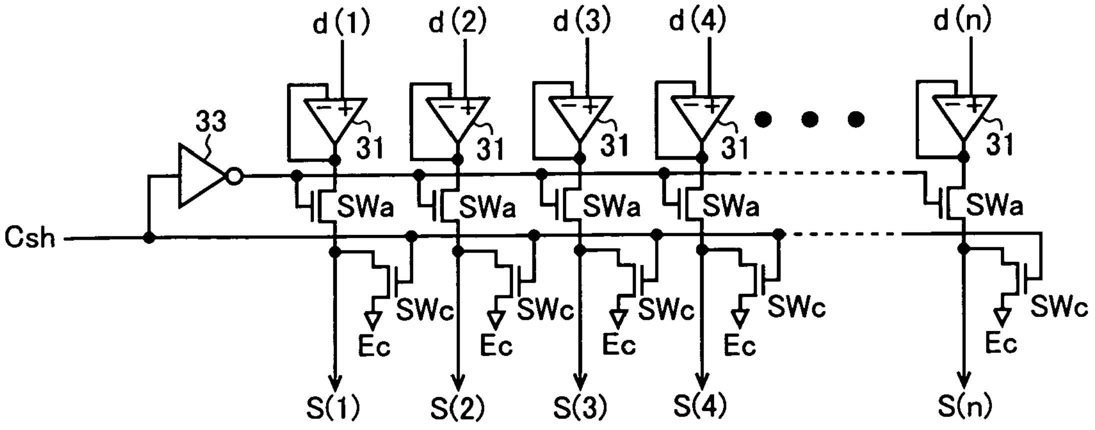
FIG. 8 is a circuit diagram showing another exemplary configuration of the output section of the source driver in the embodiment.
Figure 9:
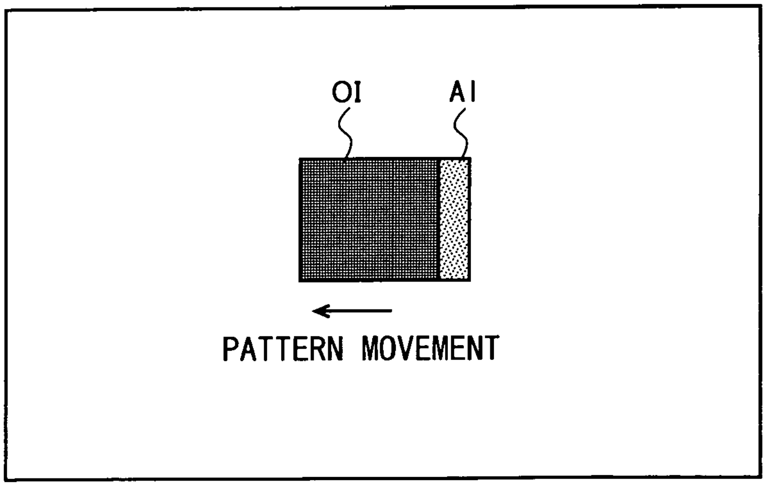
FIG. 9 is a diagram for describing a problem in moving image display in a hold type display device.

In the above-described embodiment, the configuration is such that by short-circuiting adjacent source lines when the polarity of data signals S(1) to S(n) is inverted each source line SLi (i=1 to n) obtains a voltage corresponding to black display. Instead of this, the configuration may be such that when the polarity of data signals S(1) to S(n) is inverted each source line SLi is short-circuited to a common electrode Ec (see Japanese Unexamined Patent Publication No. 11-30975 (Patent Document 3), for example). Specifically, the configuration may be such that in the configuration shown in FIG. 2, in place of second MOS transistors SWb connecting between adjacent source lines, as shown in FIG. 8, third MOS transistors SWc are provided as switching elements connecting between a common electrode Ec and output terminals connected to respective source lines in a source driver 300 and a short-circuit control signal Csh is provided to gate terminals of the third MOS transistors SWc.

The potential of each source line SLi goes to a common electrode potential Vcom and is provided to a pixel electrode through a TFT 10 being in an on state, when the source line SLi is short-circuited to the common electrode Ec. Thereafter, when the TFT 10 is changed to an off state, the potential of the pixel electrode changes from the common electrode potential Vcom by an amount corresponding to a field-through voltage ΔVd due to a parasitic capacitance Cgd of the TFT 10 (a level shift ΔVd occurs in the pixel electrode potential). However, when a level shift ΔVd caused by a parasitic capacitance Cgd is sufficiently small relative to an optical threshold voltage Vth of a liquid crystal, black display is performed until the next time the TFT 10 goes to an on state. Thus, in this case, in a liquid crystal display device including a source driver 300 whose output section is configured in the manner shown in FIG. 8, by configuring a gate driver in the manner shown in FIGS. 4(A) and 4(B) or FIGS. 6(A) and 6(B) and causing the gate driver to operate in the manner shown in FIG. 5 or 7, the same effects as those obtained in the above-described embodiment can be obtained.

More generally, the present invention can be applied as long as a source driver 300 and the like are configured such that when the polarity of data signals S(1) to S(n) is inverted each source line SLi obtains a voltage corresponding to black display. That is to say, application of the present invention is possible as long as the configuration is such that upon switching horizontal display lines a black signal (a signal corresponding to black display) is inserted in data signals S(1) to S(n) during a period corresponding to the above-described short-circuit period Tsh.

In the above-described embodiment, a circuit that causes each source line SLi (i=1 to n) to have a black voltage (a voltage corresponding to black display) during a short-circuit period Tsh serving as a black signal insertion period, i.e., a black signal insertion circuit, is implemented by first and second MOS transistors SWa and SWb and an inverter 33. In the above-described variant, a black signal insertion circuit that causes each source line SLi (i=1 to n) to have a black voltage during a short-circuit period Tsh serving as a black signal insertion period is implemented by first and third MOS transistors SWa and SWc and an inverter 33. Although in the above-described embodiment and variant such a black signal insertion circuit is provided in a source driver 300, the configuration may be such that such a black signal insertion circuit is provided external to the source driver 300, e.g., the black signal insertion circuit is integrally provided with an pixel array in a display section 100 using TFTs.

INDUSTRIAL APPLICABILITY

The present invention is to be applied to a hold type display device and is particularly suitable for use in an active matrix type liquid crystal display device using switching elements such as thin film transistors.

The invention claimed is:

1. An active matrix type display device comprising:

a plurality of data signal lines;

a plurality of scanning signal lines intersecting the plurality of data signal lines;

a plurality of pixel forming sections arranged in a matrix form correspondingly to respective intersections of the plurality of data signal lines and the plurality of scanning signal lines, each pixel forming section capturing, as a pixel value, a voltage of a data signal line passing through a corresponding intersection when a scanning signal line passing through the corresponding intersection is selected;

a common electrode provided to be shared by the plurality of pixel forming sections;

a data signal line drive circuit configured to apply a plurality of data signals representing an image to be displayed, to the plurality of data signal lines, respectively, configured to invert a polarity of the plurality of data signals every predetermined cycle in each frame period and configured to generate the plurality of data signals such that data signals applied to adjacent data signal lines have different polarities;

a black signal insertion circuit provided inside or external to the data signal line drive circuit, the black signal insertion circuit being configured to cut off the application of the plurality of data signals to the plurality of data signal lines and cause each data signal line to be short-circuited to a data signal line adjacent thereto during a black signal insertion period, when the polarity of the plurality of data signals is inverted; and a scanning signal line drive circuit configured to apply a scanning signal to each scanning signal line such that each of the plurality of scanning signal lines goes to a selected state at least once during an effective scanning period in each frame period and a scanning signal line brought to a selected state during the effective scanning period goes to a selected state at least once during the black signal insertion period within a period from when a pixel value holding period has elapsed since the scanning signal line is changed from the selected state to a non-selected state until the scanning signal line goes to a selected state during an effective scanning period in a next frame period, the effective scanning period being a period other than the black signal insertion period, wherein the display device is configured to operate in a normally black mode.

2. The display device according to claim 1, wherein the scanning signal line drive circuit causes a scanning signal line brought to a selected state during the effective scanning period to go to a selected state a plurality of times during the black signal insertion periods within a period from when the pixel value holding period has elapsed since the scanning signal line is changed from the selected state to a non-selected state until the scanning signal line goes to a selected state during an effective scanning period in a next frame period.

3. The display device according to claim 1 further comprising a display control circuit configured to generate a signal to be provided to the scanning signal line drive circuit, wherein the scanning signal line drive circuit includes a plurality of partial circuits and each partial circuit includes:

a shift register having an input terminal and an output terminal to sequentially transferring a pulse to be provided to the input terminal, to the output terminal;

a clock input terminal to supply a clock signal to the shift register;

an output control input terminal for an output control signal to control an output of scanning signals to be outputted from the partial circuit; and combinational logic circuits to generate pulse signals corresponding to the scanning signals to be outputted from the partial circuit, based on output signals from respective stages of the shift register, a clock signal to be provided to the clock input terminal, and an output control signal to be provided to the output control input terminal, the plurality of partial circuits are cascade-connected by connecting an input terminal of a shift register in a partial circuit to an output terminal of a shift register in another partial circuit, and the display control circuit provides a clock signal in common to the clock input terminals of the plurality of partial circuits and provides individual output control signals to the output control input terminals of the plurality of partial circuits, respectively.

4. The display device according to claim 1 further comprising a display control circuit to generate a signal to be provided to the scanning signal line drive circuit, wherein the scanning signal line drive circuit includes a plurality of partial circuits and each partial circuit includes:

a shift register having an input terminal and an output terminal to sequentially transferring a pulse to be provided to the input terminal, to the output terminal;

a clock input terminal to supply a clock signal to the shift register;

first and second output control input terminals for an output control signal to control an output of scanning signals to be outputted from the partial circuit;

a selector switch to select any one of two output control signals to be provided to the first and second output control input terminals; and combinational logic circuits to generate pulse signals corresponding to the scanning signals to be outputted from the partial circuit, based on output signals from respective stages of the shift register, a clock signal to be provided to the clock input terminal, and an output control signal selected by the selector switch, the plurality of partial circuits are cascade-connected by connecting an input terminal of a shift register in a partial circuit to an output terminal of a shift register in another partial circuit, and the display control circuit provides a clock signal in common to the clock input terminals of the plurality of partial circuits, provides a predetermined first output control signal in common to the first output control input terminals of the plurality of partial circuits, and provides a predetermined second output control signal in common to the second output control input terminals of the plurality of partial circuits.

5. The display device according to claim 1, wherein the pixel value holding period is a period corresponding to 50% to 80% of one frame period.

6. A drive method for an active matrix type display device including a plurality of data signal lines; a plurality of scanning signal lines intersecting the plurality of data signal lines; and a plurality of pixel forming sections arranged in a matrix form correspondingly to respective intersections of the plurality of data signal lines and the plurality of scanning signal lines, each pixel forming section capturing, as a pixel value, a voltage of a data signal line passing through a corresponding intersection when a scanning signal line passing through the corresponding intersection is selected, the drive method comprising:

a data signal line driving step to apply a plurality of data signals representing an image to be displayed, to the plurality of data signal lines, respectively, and inverting polarity of the plurality of data signals every predetermined cycle in each frame period and to generate the plurality of data signals such that data signals applied to adjacent data signal lines have different polarities;

a black signal inserting step of cutting off the application of the plurality of data signals to the plurality of data signal lines and causing each data signal line to be short-circuited to a data signal line adjacent thereto during a black signal insertion period, when the polarity of the plurality of data signals is inverted; and a scanning signal line driving step of applying a scanning signal to each scanning signal line such that each of the plurality of scanning signal lines goes to a selected state at least once during an effective scanning period in each frame period and a scanning signal line brought to a selected state during the effective scanning period goes to a selected state at least once during the black signal insertion period within a period from when a predetermined pixel value holding period has elapsed since the scanning signal line is changed from the selected state to a non-selected state until the scanning signal line goes to a selected state during an effective scanning period in a next frame period, the effective scanning period being a period other than the black signal insertion period, wherein the display device is configured to operate in a normally black mode.

7. The drive method according to claim 6, wherein in the data signal line driving step, the plurality of data signals are generated such that data signals to be respectively applied to adjacent data signal lines have different polarities, and in the black signal inserting step, each data signal line is short-circuited to a data signal line adjacent thereto during the black signal insertion period.

* * * * *

UNITED STATES PATENT AND TRADEMARK OFFICE

CERTIFICATE OF CORRECTION

PATENT NO. : 8,358,292 B2
APPLICATION NO. : 11/922756
DATED : January 22, 2013
INVENTOR(S) : Nagashima It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1273 days.

Signed and Sealed this
Eleventh Day of November, 2014

Michelle K. Lee
*Deputy Director of the United States Patent and Trademark Office*